United States Patent
Gunder et al.

(10) Patent No.: US 8,390,962 B2
(45) Date of Patent: Mar. 5, 2013

(54) LAPPING METHOD AND STATION TO ACHIEVE TIGHT DIMENSION CONTROLS FOR BOTH READ AND WRITE ELEMENTS OF MAGNETIC RECORDING HEADS AND MAGNETIC STORAGE DEVICE FORMED THEREBY

(75) Inventors: Jeffrey P. Gunder, Los Altos, CA (US); Ian R. McFadyen, San Jose, CA (US); Darrick T. Smith, San Jose, CA (US); Scott A. Thomas, San Jose, CA (US); Xiao Z. Wu, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 1821 days.

(21) Appl. No.: 11/238,786

(22) Filed: Sep. 29, 2005

(65) Prior Publication Data

US 2007/0070543 A1 Mar. 29, 2007

(51) Int. Cl.
*G11B 5/31* (2006.01)
*B24B 49/00* (2006.01)
*B24B 1/00* (2006.01)

(52) U.S. Cl. ..................................................... 360/316

(58) Field of Classification Search ................. 451/1, 5, 451/8, 9, 11, 28, 41, 232, 272, 279, 366; 29/603.01, 603.09, 603.1, 603.15, 603.16, 603.18, 593; 360/316, 317
See application file for complete search history.

(56) References Cited

U.S. PATENT DOCUMENTS

| | | | | |
|---|---|---|---|---|
| 6,027,397 A * | 2/2000 | Church et al. | | 451/1 |
| 6,884,148 B1 * | 4/2005 | Dovek et al. | | 451/5 |
| 7,384,327 B2 * | 6/2008 | Mizoguchi et al. | | 451/8 |
| 2005/0070206 A1 * | 3/2005 | Kasiraj et al. | | 451/5 |
| 2006/0028770 A1 | 2/2006 | Etoh et al. | | |

FOREIGN PATENT DOCUMENTS

| JP | 10105930 A | * | 4/1998 |
|---|---|---|---|
| JP | 11185218 A | * | 7/1999 |
| JP | 2003220549 A | * | 8/2003 |
| JP | 2004249375 A | * | 9/2004 |

* cited by examiner

*Primary Examiner* — Will J Klimowicz
(74) *Attorney, Agent, or Firm* — Merchant & Gould

(57) ABSTRACT

A station for performing a lapping method to achieve tight dimension controls for both read and write elements of magnetic recording heads is disclosed. A recording head having a read head stripe height and a write head throat height is lapped using a plurality of lapping forces. At least one of the plurality of lapping forces includes a torque force. A lapping wedge angle is controlled using at least one torque force, which controls the offset between the recording head read head stripe height and the write head throat height.

6 Claims, 9 Drawing Sheets

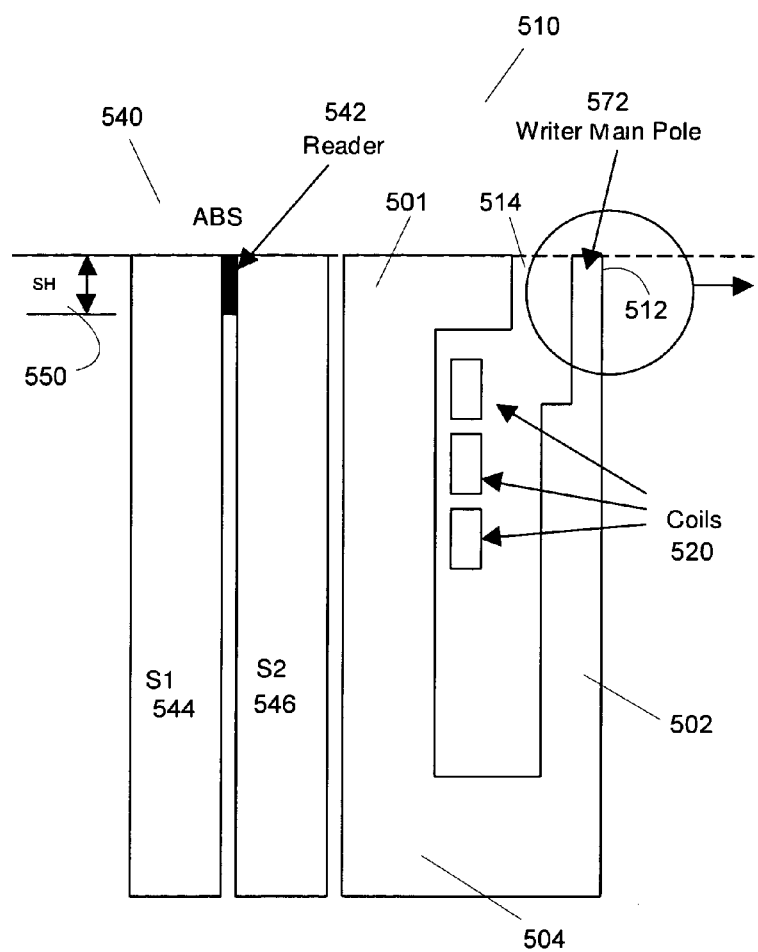
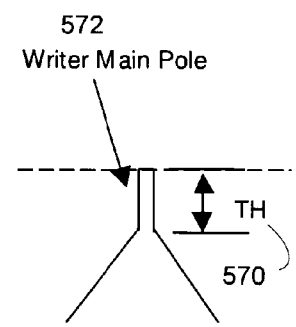
Side View
Fig. 5A
Top View
Fig. 5B

LAPPING METHOD AND STATION TO ACHIEVE TIGHT DIMENSION CONTROLS FOR BOTH READ AND WRITE ELEMENTS OF MAGNETIC RECORDING HEADS AND MAGNETIC STORAGE DEVICE FORMED THEREBY

BACKGROUND OF THE INVENTION

1. Field of the Invention

This invention relates in general to the manufacture of magnetic heads, and more particularly to a lapping method and station to achieve tight dimension controls for both read and write elements of magnetic recording heads and magnetic storage device formed thereby.

2. Description of Related Art

Fixed magnetic storage systems are now commonplace as a main non-volatile storage in modern personal computers, workstations, and portable computers. Storage systems are now capable of storing hundreds of gigabytes of digital data, even when implemented in portable computers.

As disk drive technology progresses, more data is compressed into smaller areas. Increasing data density is dependent upon read/write heads fabricated with smaller geometries capable of magnetizing or sensing the magnetization of correspondingly smaller areas on the magnetic disk. The advance in magnetic head technology has led to heads fabricated using processes similar to those used in the manufacture of semiconductor devices.

A typical disk drive is comprised of a magnetic recording medium in the form of a disk for storing information, and a magnetic recording head for reading or writing information on the disk. The disk rotates on a spindle controlled by a drive motor and the magnetic recording head is attached to a slider supported above the disk by an actuator arm. When the disk rotates at high speed a cushion of moving air is formed lifting the air bearing surface (ABS) of the magnetic recording head above the surface of the disk.

The write portion of a recording head is typically fabricated using a coil embedded in an insulator between a top and bottom magnetic layer. The magnetic layers are arranged as a magnetic circuit, with pole tips forming a magnetic gap at the air bearing surface of the head. When a data bit is to be written to the disk, the disk drive circuitry sends current through the coil creating a magnetic flux. The magnetic layers provide a path for the flux and a magnetic field generated at the pole tips magnetizes a small portion of the magnetic disk, thereby storing a data bit on the disk.

The read portion of the magnetic recording head is typically formed using a magnetoresistive (MR) element. This element is a layered structure with one or more layers of material exhibiting the magnetoresistive effect. The resistance of a magnetoresistive element changes when the element is in the presence of a magnetic field. Data bits are stored on the disk as small, magnetized region on the disk. As the disk passes by beneath the surface of the magnetoresistive material in the read head, the resistance of the material changes and this change is sensed by the disk drive control circuitry.

Multiple magnetic recording heads are built in a wafer via lithographic and film deposition process. The wafer is processed to form multiple pieces (each piece is called a slider); on each piece there is one magnetic recording head. The sliders are then polished to achieve both flat surface, on which ABS is formed, and the desired stripe height for the reading head and throat heights for writing head.

The targeted dimension for a reader, stripe height (SH) is determined according to, for example, an Electronic Lapping Guide (ELG) or its direct resistance value. The height of write element (throat height) is neither monitored nor actively controlled. The final throat height is determined by the final stripe height and the offset between the read and write element, which is defined in the wafer fabrication process. Variations of final throat height result from wafer and slider fabrication processes. Wafer processes cause variations of final throat height because read and write elements are physically separated in two layers (between 8-10 microns), and these generally cannot be aligned to better than 30 nm. Slider fabrication processes also cause variations in final throat height because due to the physical separation of the read and write elements, any wedge angle during lapping will translate to different removal of read and write elements. For example a 5 um ($\Delta$) wedge over a slider body length of L=1.25 mm will cause 40 nm ($\delta$) difference in removal between a read and write elements separated 10 um apart (d). Currently, the wedge is neither monitored nor controlled.

For longitudinal recording heads, the throat height control is not currently as critical to the write element performance and the tolerance of both wafer and slider fabrication process is acceptable. But as the longitudinal recording heads can no longer support the aerial density growth of magnetic recording technology, perpendicular recording heads are the necessary technology for the future. For perpendicular recording heads, the throat height control is as important as the stripe height control.

It can be seen that there is a need to control stripe height and throat height of magnetic recording heads with a higher precision (e.g., better than 10 nm) than is available from current lithographic and lapping processes.

SUMMARY OF THE INVENTION

To overcome the limitations in the prior art described above, and to overcome other limitations that will become apparent upon reading and understanding the present specification, the present invention discloses a lapping method and station to achieve tight dimension controls for both read and write elements of magnetic recording heads and magnetic storage device formed thereby.

The present invention provides a station that controls a lapping wedge angle using at least one torque force, which controls the offset between the recording head read head stripe height and the write head throat height. The wedge angle is controlled using at least one torque force. The torque force controls the offset between the recording head read head stripe height and the write head throat height.

In an embodiment of the present invention, a system for configuring a magnetic head is provided. The system for configuring a magnetic head includes a lapping station for configuring a magnetic head and a control device for monitoring the configuring of the magnetic head to produce a magnetic head having a read head and a write head, wherein the write head has a write head throat height within about 10 nm of a target write head throat height, the control device controlling at least one torque force to form a shape of a read head stripe height and the write head throat height separately to desired dimensions.

In another embodiment of the present invention, a device for controlling stripe height and throat height of a recording head is provided. The method includes means for lapping a recording head having a read head stripe height and a write head throat height using a plurality of lapping forces, wherein at least one of the plurality of lapping forces includes an applied torque and means for controlling a lapping wedge angle using the applied torque, wherein the applied torque controls the offset between the read head stripe height and the write head throat height.

In another embodiment of the present invention, a system for configuring a magnetic head is provided. The system for configuring a magnetic head includes means for configuring a magnetic head and means for monitoring the configuring of the magnetic head to produce a magnetic head having a read head and a write head, wherein the write head has a write head throat height within about 10 nm of a target write head throat height, the control device controlling at least one torque force to form a shape of a read head stripe height and the write head throat height separately to desired dimensions.

In another embodiment of the present invention, a method for controlling stripe height and throat height of a recording head is provided. The method includes lapping a recording head having a read head stripe height and a write head throat height using a plurality of lapping forces, wherein at least one of the plurality of lapping forces includes an applied torque and controlling a lapping wedge angle using the applied torque, wherein the applied torque defines the offset between the read head stripe height and the write head throat height.

In another embodiment of the present invention, another method for controlling stripe height and throat height of a recording head is provided. This method includes forming a recording head having a read head and a write head, measuring a read-write offset, providing the measured read-write offset to a lapping process and adjusting a torque force of the lapping process to achieve a wedge angle that cancels the measured read-write offset.

In another embodiment of the present invention, a magnetic storage device is provided. The magnetic storage device includes magnetic media for storing data thereon, a magnetic head for reading and writing data on the magnetic media, a motor for translating the position of the magnetic media and an actuator for positioning the magnetic head relative to the magnetic media, wherein the magnetic head includes, a read head and a write head, wherein the write head has a write head throat height approximate a target write head throat height.

In another embodiment of the present invention, another magnetic storage device is provided. This magnetic storage device includes means for storing magnetic data thereon, means for reading and writing data on the means for storing magnetic data, means for translating the position of the means for storing magnetic data and means for positioning the means for reading and writing data relative to the means for storing magnetic data, wherein the means for reading and writing data on the means for storing magnetic data further includes means for recording, wherein the means for recording includes a read head and a write head, wherein the write head has a write head throat height approximate a target write head throat height.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIGS. 5A and B are side cross-sectional view and top view of a perpendicular recording magnetic head;

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a lapping method and station to achieve tight dimension controls for both read and write elements of magnetic recording heads and magnetic storage device formed thereby. The present invention involves the formation of a lapping wedge angle that is controlled using at least one torque force. The torque force controls the offset between the recording head read head stripe height and the write head throat height. A station is provided that controls a lapping wedge angle using at least one torque force, which controls the offset between the recording head read head stripe height and the write head throat height.

Figure 1:
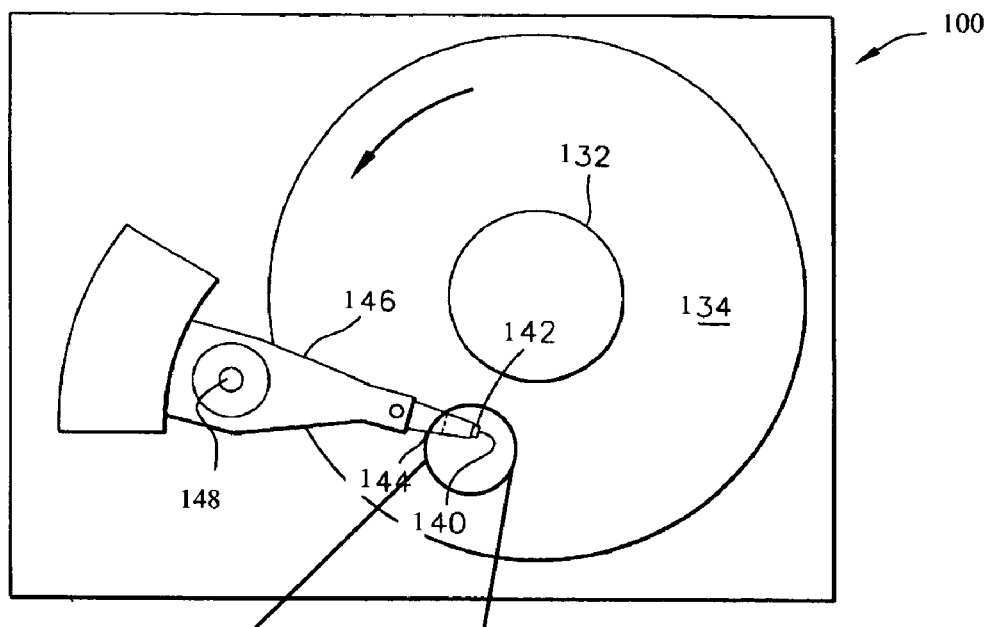
FIG. 1 illustrates a storage system according to the present invention.

FIG. 1 illustrates a storage system 100 according to the present invention. In FIG. 1, a magnetic recording head 140 is built on a slider 142 that is supported by a suspension 144 and actuator arm 146. The magnetic recording head 140 is under control of an actuator 148. The actuator 148 controls the position of the magnetic recording head 140. The suspension 144 and actuator arm 146 positions the slider 142 so that the magnetic head 140 may read and write data to the magnetic medium 134. The magnetic recording head 140 writes and reads data on magnetic medium 134 rotated by a spindle 132.

Figure 2:
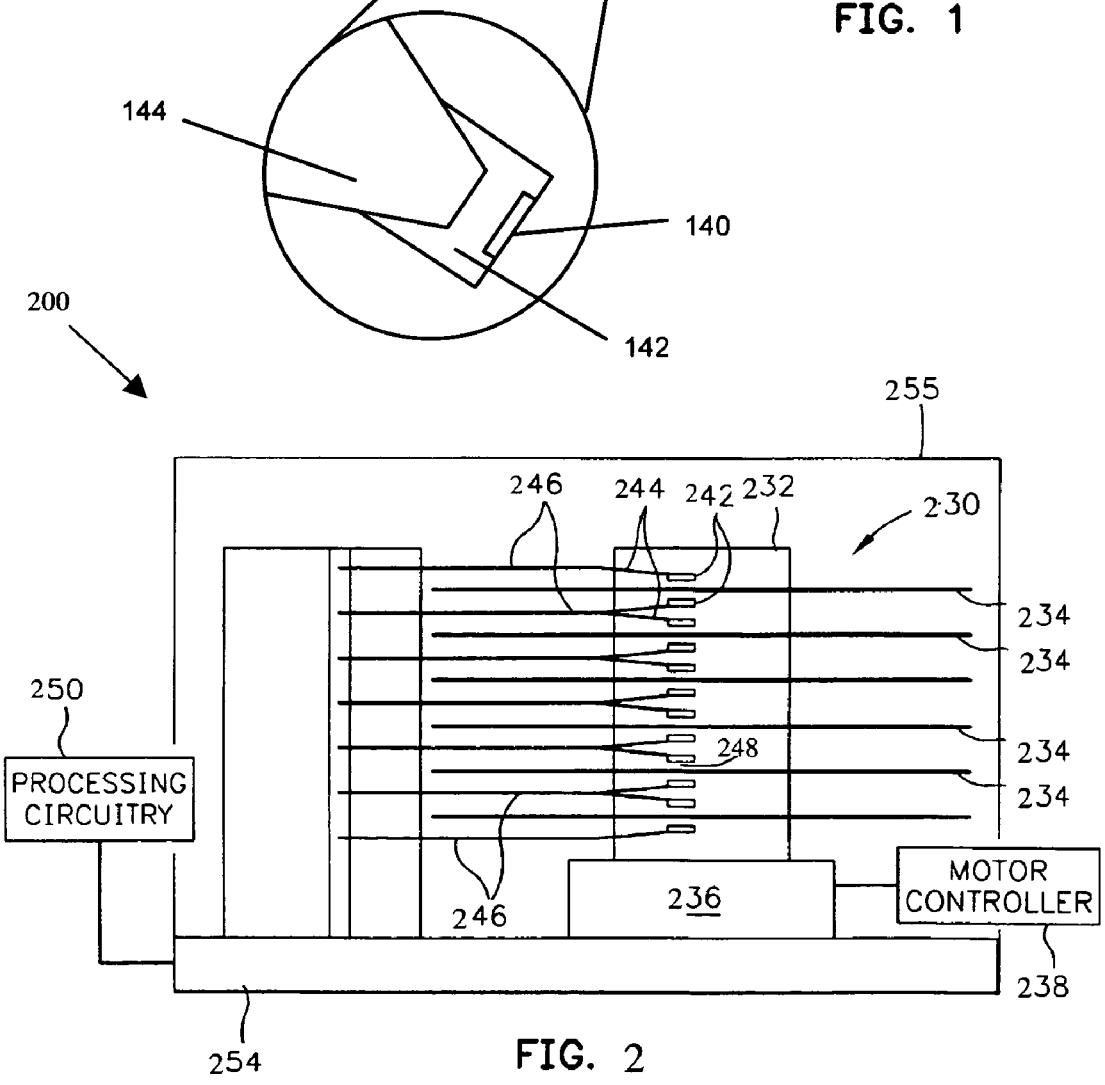
FIG. 2 illustrates one particular embodiment of a storage system according to the present invention.

FIG. 2 illustrates one particular embodiment of a storage system 200 according to the present invention. In FIG. 2, a hard disk drive 230 is shown. The drive 230 includes a spindle 232 that supports and rotates magnetic disks 234. A motor 236, mounted on a frame 254 in a housing 255, which is controlled by a motor controller 238, rotates the spindle 232. A combined read and write magnetic head is built on a slider 242 that is supported by a suspension 244 and actuator arm 246. Processing circuitry 250 exchanges signals, representing such information, with the head, provides motor drive signals for rotating the magnetic disks 234, and provides control signals for moving the slider to various tracks. The plurality of disks 234, sliders 242 and suspensions 244 may be employed in a large capacity direct access storage device (DASD).

When the motor 236 rotates the disks 234 the slider 242 is supported on a thin cushion of air (air bearing) between the surface of the disk 234 and the air bearing surface (ABS) 248. The magnetic head may then be employed for writing information to multiple circular tracks on the surface of the disk 234, as well as for reading information therefrom.

Figure 3:
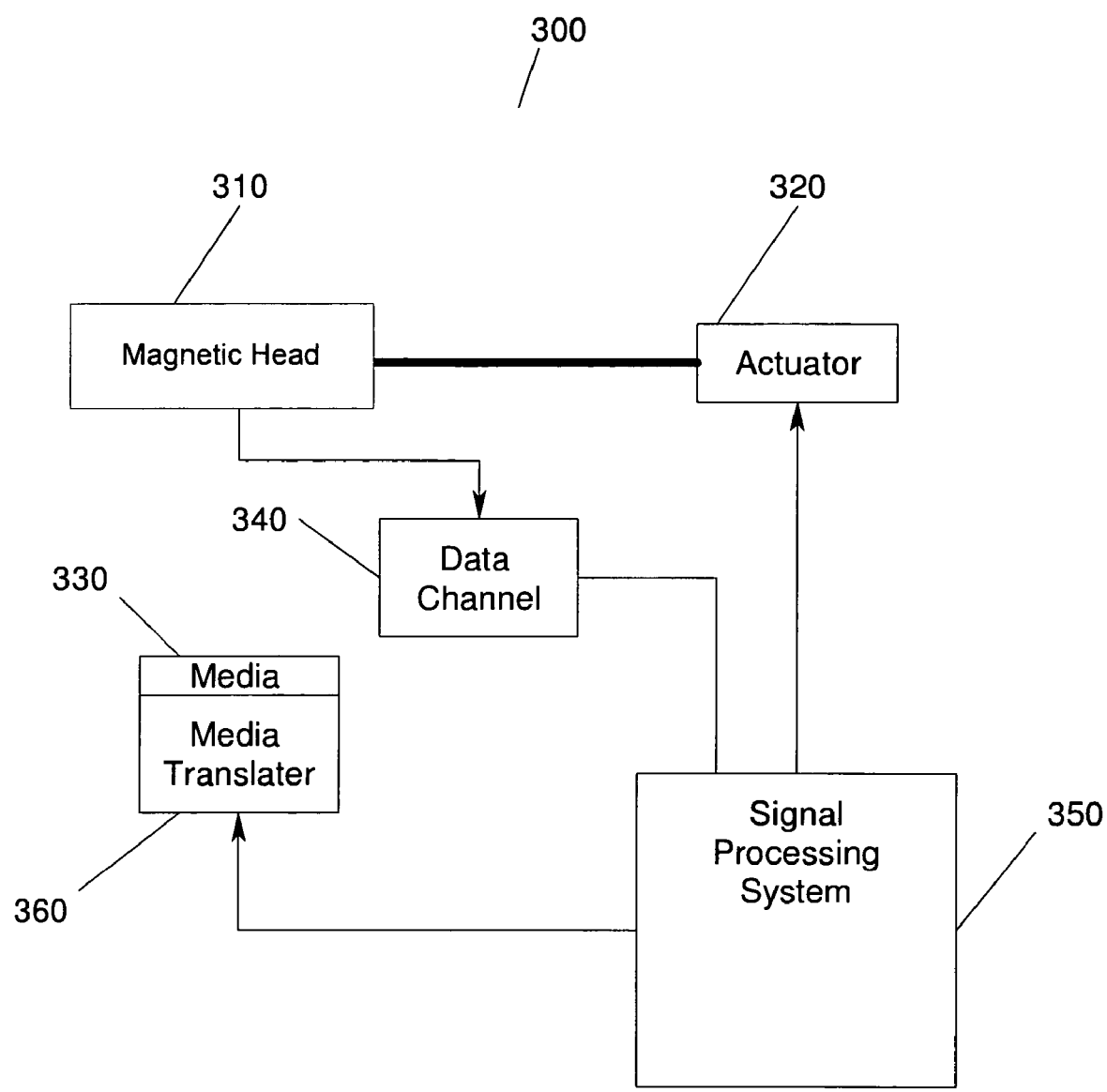
FIG. 3 illustrates a storage system according to the present invention.

FIG. 3 illustrates a storage system 300. In FIG. 3, a magnetic head 310 is under control of an actuator 320. The actuator 320 controls the position of the magnetic head 310. The magnetic head 310 writes and reads data on magnetic media 330. The read/write signals are passed to a data channel 340. A signal processor system 350 controls the actuator 320 and processes the signals of the data channel 340. In addition, a media translator 360 is controlled by the signal processor system 350 to cause the magnetic media 330 to move relative to the magnetic head 310. Nevertheless, the present invention is not meant to be limited to a particular type of storage system 300 or to the type of media 330 used in the storage system 300.

Figure 4:
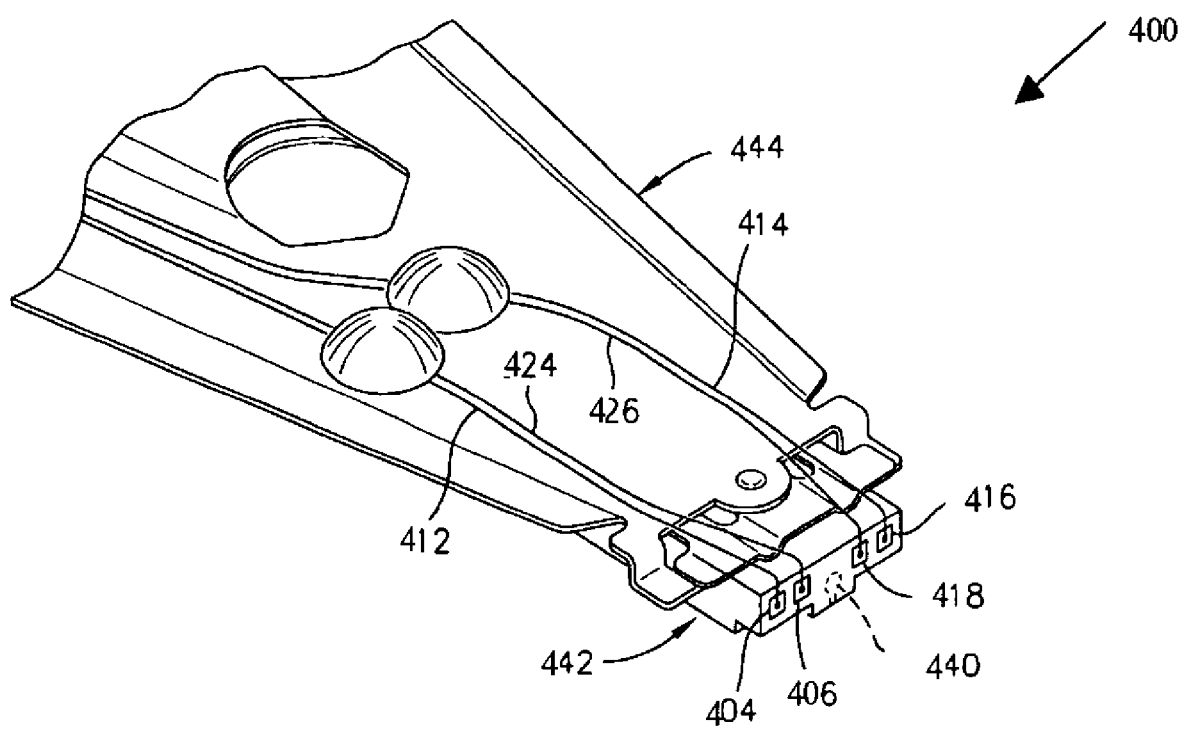
FIG. 4 is an isometric illustration of a suspension system for supporting a slider and a magnetic head.

FIG. 4 is an isometric illustration of a suspension system 400 for supporting a slider 442 having a magnetic head built in thereto. In FIG. 4 first and second solder connections 404 and 406 connect leads from the read sensor 440 to leads 412 and 424 on the suspension 444 and third and fourth solder connections 416 and 418 connect the write coil to leads 414 and 426 on the suspension 444. However, the particular locations of connections may vary depending on head design.

FIGS. 5A and B are side cross-sectional view and top view of a perpendicular magnetic head. The write head 510 includes first and second pole pieces 501 and 502 which extend from the ABS to back gap portion 504 which is recessed in the head. The second pole piece 502 includes a flared pole tip layer (PT layer) 512. Located between the first and second pole pieces 500 and 502 is an insulation layer 514 which extends from the ABS to the back gap layer 504 and has embedded therein at least one write coil layer 520. Read head 540 includes sensor 542 and shields, S1 544 and S2 546. The first 544 and second 546 shield layers protect the sensor 542 from stray magnetic fields. FIG. 5A shows the stripe height 550. The stripe height 550 is important in establishing the magnetics of the read sensor 540. For example, control of stripe height 550 is important in controlling device resistance, device output amplitude, device bias point and consequently many related measures of performance.

FIG. 5B is a top view of a perpendicular magnetic head showing the throat height 570. The throat height 570 plays a key role in obtaining a desirable BPI (Bits Per Inch) and a desirable TPI (Tracks Per Inch). The throat height 570 is the length of a portion of write main pole piece from the ABS to a recessed location within the head where the pole piece begins to flare. In general, a longer throat height 570 provides a higher TPI. A shorter throat height 570 provides a higher BPI, which is the reason that an optimized throat height is desired for the best magnetic performance.

Figure 6:
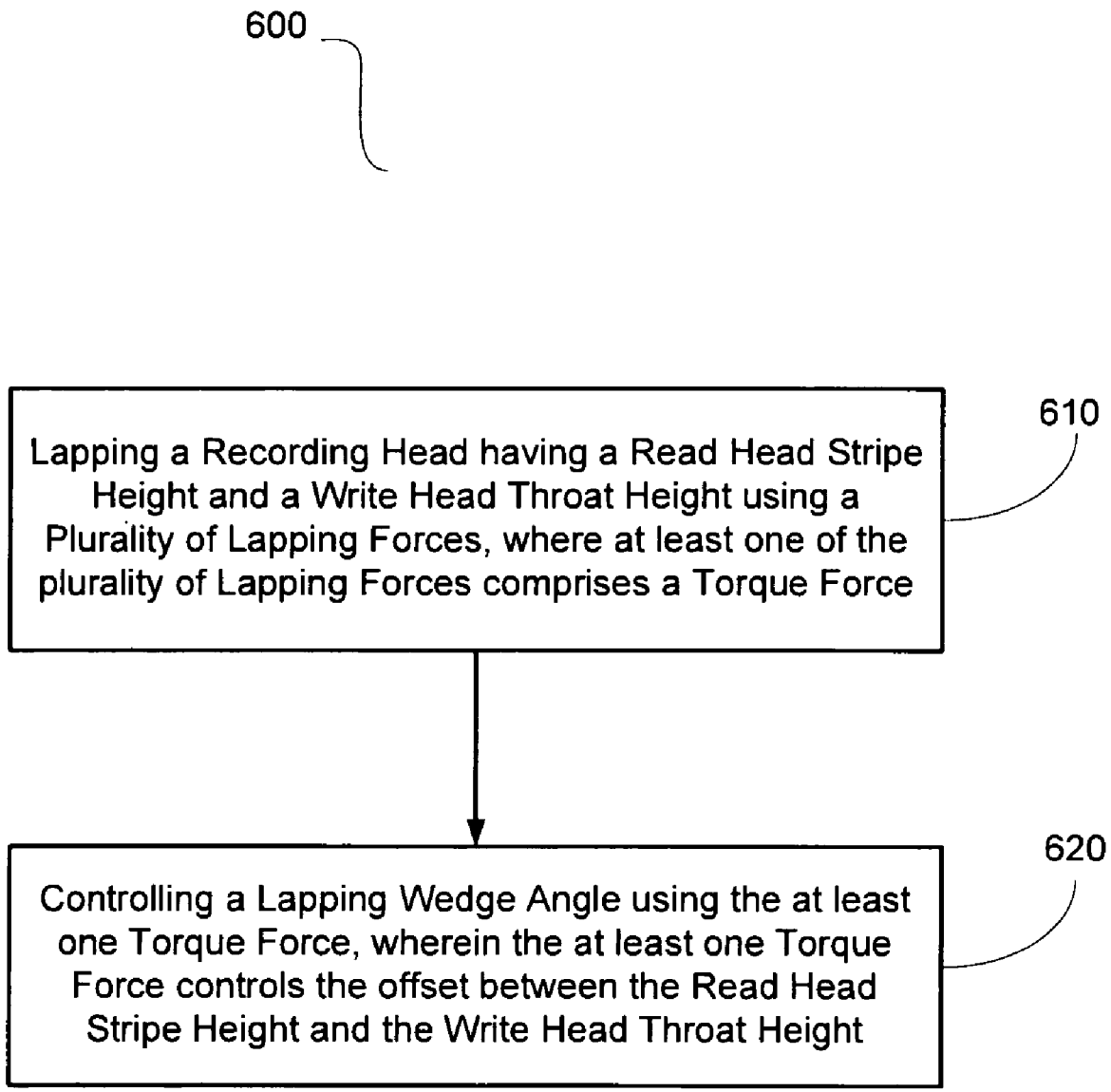
FIG. 6 is a flowchart of a method for controlling stripe height and throat height of a recording head in accordance with an embodiment of the invention.

FIG. 6 illustrates a method 600 for controlling stripe height and throat height of a recording head in accordance with an embodiment of the invention. A recording head with a read head stripe height and a write head throat height is lapped 610 using a plurality of lapping forces. According to an embodiment of the invention, one or more of the plurality of lapping forces is a torque force. A lapping wedge angle is controlled 620 using the one or more torque forces. This allows the torque forces to be adjusted in order to control the offset between read head stripe height and the write head throat height, such that at the completion of the lapping, both the stripe height and throat height meet the dimension requirement.

Figure 7A:
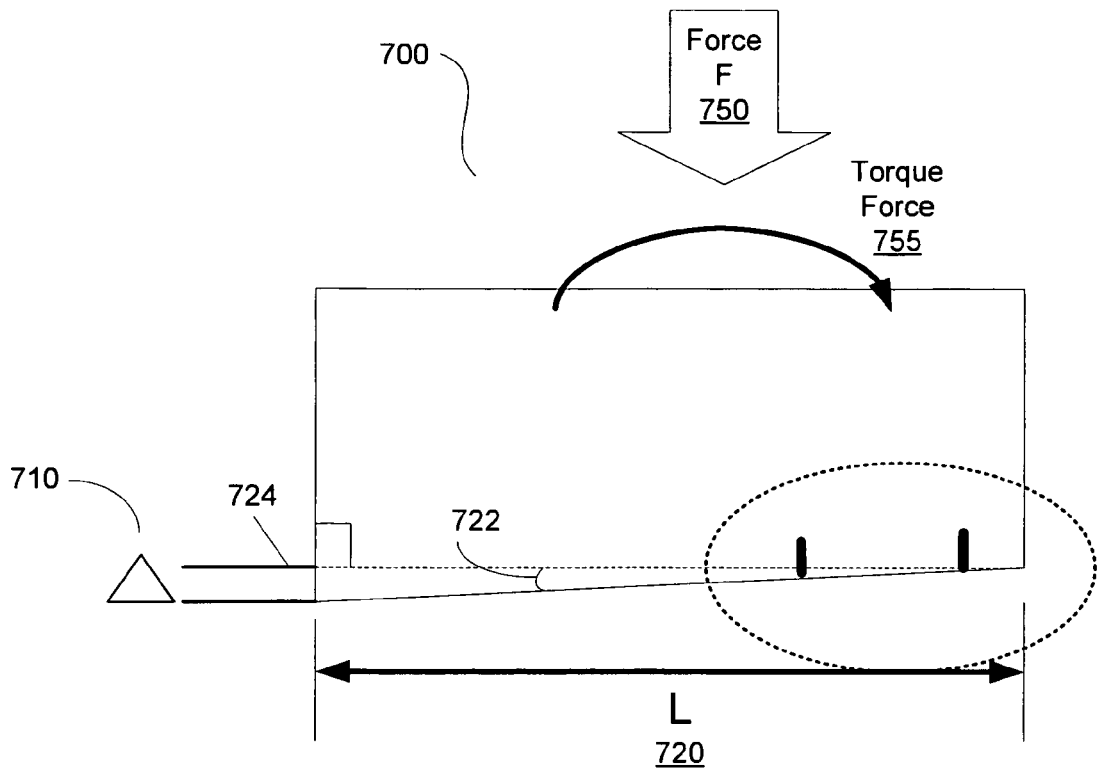
FIGS. 7A and B are illustrations a side view of slider air-bearing-surface (ABS) that can be fabricated using methods in accordance with an embodiment of the present invention.
Figure 7B:
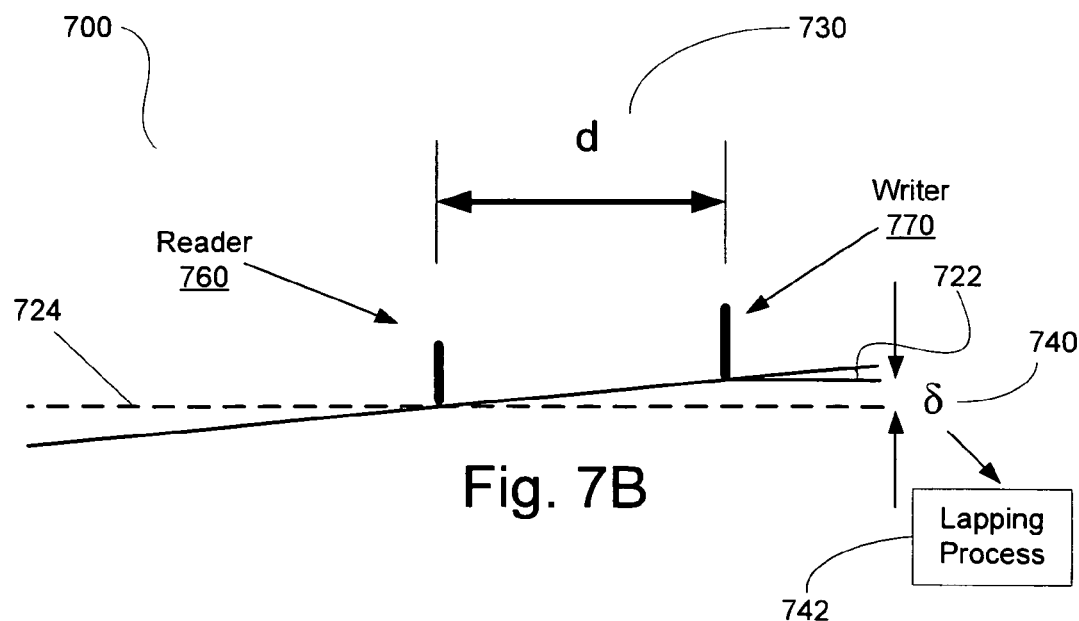

FIGS. 7A and B are side views 700 of sliders that can be fabricated using methods in accordance with an embodiment of the present invention. FIG. 7B is an enlarged view of the oval area of FIG. 7A. Slider 700 includes a wedge Δ 710, a slider length L 720, spacing between read and write element d 730, and offset δ 740 (d Δ/L). The slider 700 is created using wedge Δ 710 with the wedge angle (Δ/L) 722 with respect to a wafer normal plane 724. According to one embodiment of the present invention, a torque force 755, a particular type of lapping force 750, actively controls the wedge angle (Δ/L). Torque force 755 results in more lapped material on the left-hand side of slider ABS 700 to adjust the existing wedge Δ 710. When the stripe height is lapped to its final target dimension, the offset δ 740 is adjusted such that the throat height reaches its own target dimension at the same time. This adjustment of the offset δ 740 not only will avoid any additional error in the lapping process, but also should cancel the reader-writer offset introduced in the lithographic steps of the wafer manufacturing process.

According to an embodiment of the invention, the read-write offset δ 740 will be measured at the wafer level after the lithographic process and the measurement of the offset δ 740 will be fed-forward to the lapping operation 742 during the lapping process. The torque force 755 is applied to achieve a target wedge angle (Δ/L) that will cancel the read-write offset δ 740. For example: a typical reader and writer may have a spacing d=8 um, wherein a reader-writer offset δ=40 nm corresponds a wedge angle of δ/d=0.005 radians=0.28 deg. This wedge angle is well within the range that can be achieved with the described torque force 755.

Alternatively, the stripe height of the read head 760 and the throat height of the write head 770 of slider 700 are monitored simultaneously during slider lapping processes according to an embodiment of the invention. Monitoring the stripe height of the read head 760 and the throat height of the write head 770 is performed by, for example, using electric lapping guides (ELGs) associated with each of the read and write elements and monitoring the signals received from the ELGs. The difference between the two ELG readings can be used to control torque forces, such as torque force 755. Using two ELGs in the lapping control process not only will not generate additional offset δ 740 (d Δ/L) between the read and write elements, but will actively cancel the offset δ 740 (d Δ/L) created in the lithographic process, row parting, or any earlier process. This allows for a write head throat height 770 to be controlled within 10 nm of the target write head throat height. In further embodiments, read head stripe height 760 is controlled within 10 nm of a target read head stripe height.

Figure 8:
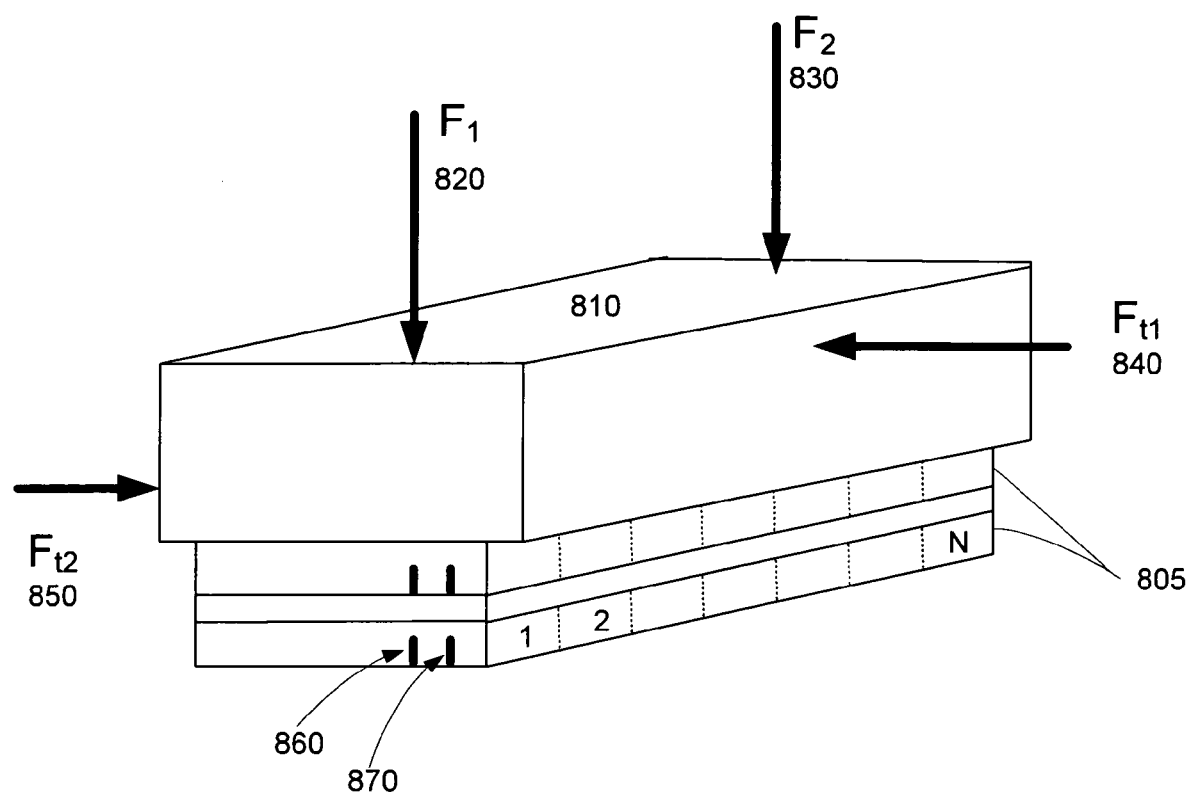
FIG. 8 is an illustration of multiple rows of N sliders, attached to an extender that can be fabricated using methods in accordance with an embodiment of the present invention.

FIG. 8 is an illustration of multiple rows of N sliders 805, attached to an extender 810. Forces $F_1$ 820 and $F_2$ 830 are applied to the slider rows through the extender against the lapping plate. Target lapping rates and target dimensions are controlled by lapping forces, such as $F_1$ 820 and $F_2$ 830, where higher force achieves higher lapping rate and a reduced force or a reverse in force direction terminates the lapping process. The average force $F_1$ 820 and $F_2$ 830 are adjusted to achieve the average lapping rate of the whole row, and the $F_1$ 820 and $F_2$ 830 may be applied differently to achieve the uniform lapping of all sliders across the row. According to an embodiment of the present invention, a torque is applied using torque forces Ft1 840 and Ft2 850. $F_{t1}$ 840 and $F_{t2}$ 850 can be applied according to the feedback received from the read and write ELGs, for example, in order to simultaneously achieve both target dimensions of read 860 and write 870 elements.

Figure 9:
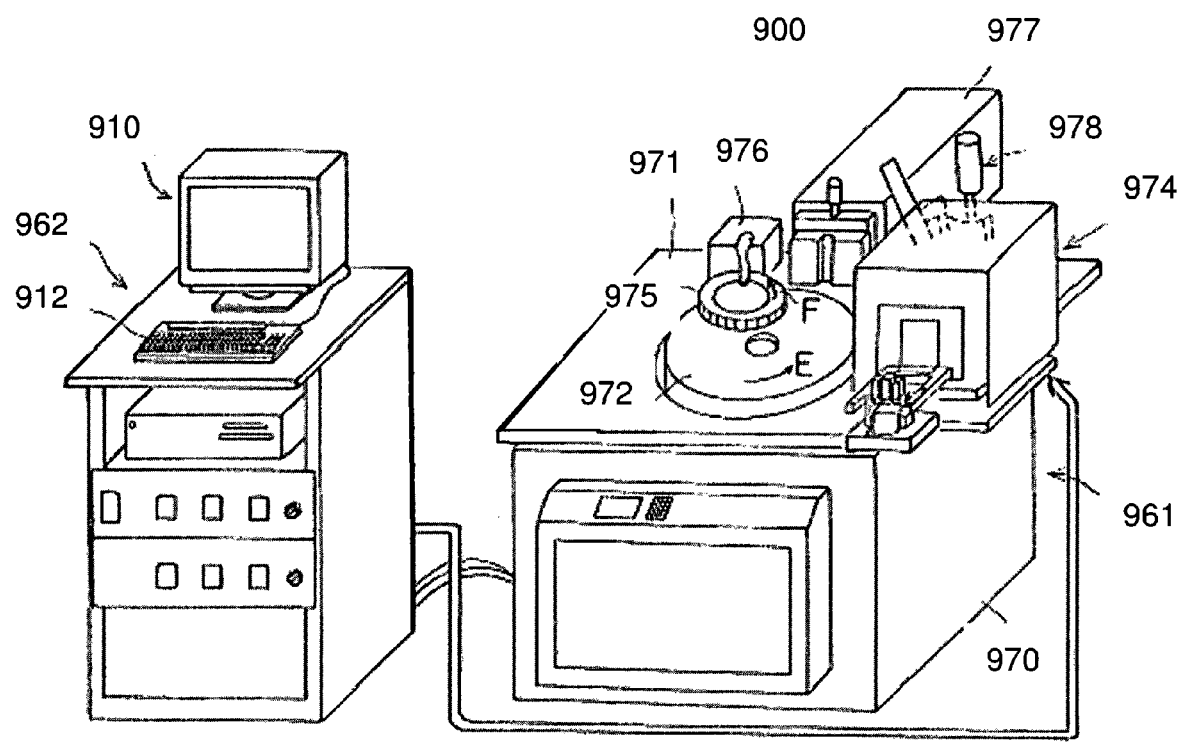
FIG. 9 shows a lapping station according to one embodiment of the present invention.

FIG. 9 shows a lapping station 900 for fabricating a magnetic head according to one embodiment of the present invention. In broad terms the lapping station includes a lapping device 961 and a control unit 962. The control unit may be accessed via a keyboard 912 and display 910. The lapping device 961 includes a table base 970, a table 971 mounted on the table base 970, a rotary lapping plate 972, lapping unit 974, a ring 975 for spreading slurry supplied from a slurry supply unit 976 over an upper surface of the rotary lapping plate 972, a facing unit 977, and a wiper unit 978.

The rotary lapping plate 972 is positioned at a center of the table 971 and rotates in a direction indicated by arrow E in the diagram. The ring 975 rotates in a direction indicated by arrow F in the diagram. The lapping unit 974 is shown positioned laterally at a right side of the rotary lapping plate 972. The slurry supply unit 976 that supplies slurry to an inner side of the ring 975, the facing unit 977 that dresses the rotary lapping plate 972, and the wiper unit 978 that wipes slurry off the rotary lapping plate 972 are positioned at a rear periphery of the rotary lapping plate 972.

Figure 10:
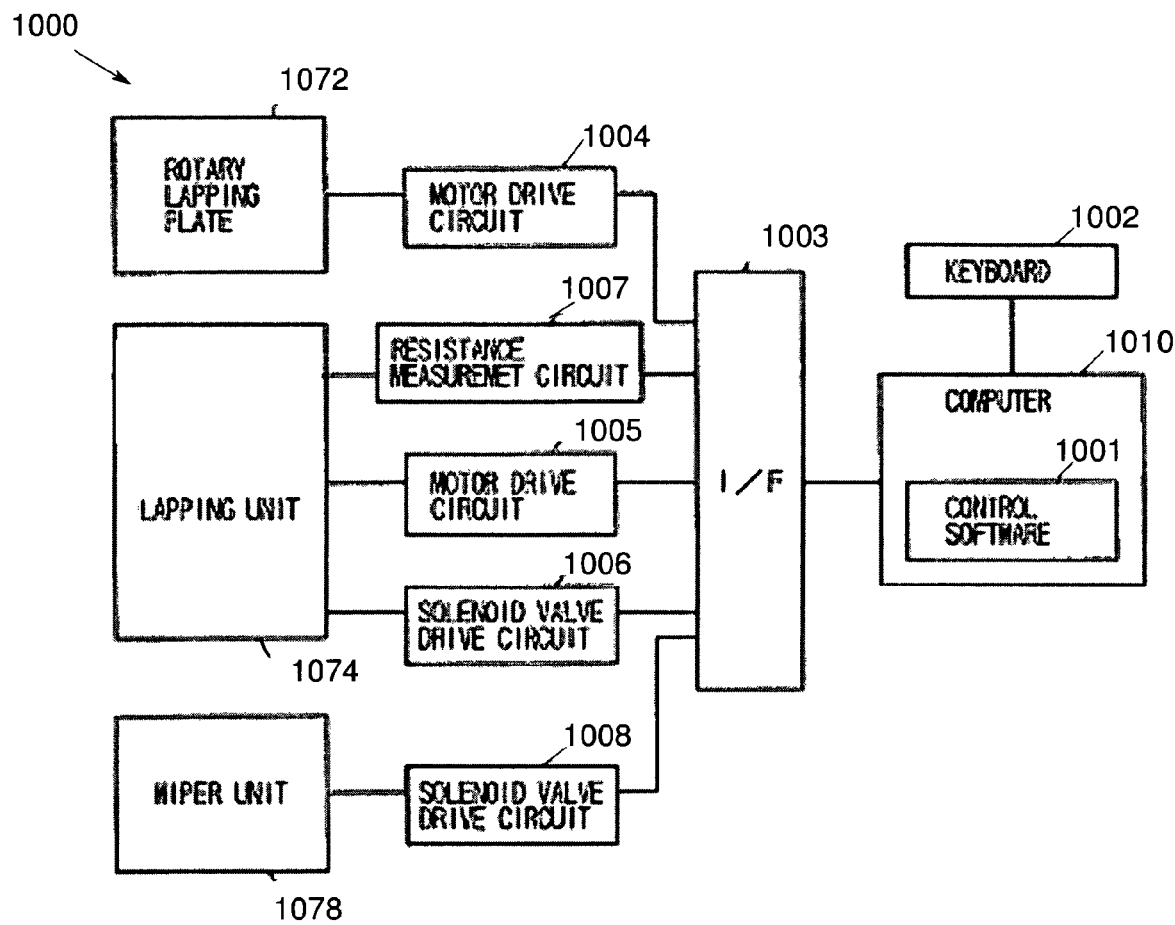
FIG. 10 is a block diagram of the lapping station depicted in FIG. 9 that can be used according to an embodiment of the present invention.

FIG. 10 is a block diagram of the lapping station 1000 depicted in FIG. 9 that can be used in accordance with an embodiment of the present invention. The control unit 62, as shown in FIG. 9, comprises a computer 1010 that uses appropriate control program software 1001 and has a keyboard 1002. The computer 1010 is connected via an interface 1003 to a motor drive unit 1004 for lapping plate 1072, a motor drive circuit 1005, a solenoid valve drive circuit 1006, a resistance measurement circuit 1007 for lapping unit 1074 and a solenoid valve drive circuit 1008 for wiper unit 1078.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for controlling stripe height and throat height of a recording head, comprising:
    measuring a read-write offset;
    providing the measured read-write offset to a lapping process; and
    lapping the read and write head while applying a torque force to achieve a target wedge angle for canceling the measured read-write offset to provide a target stripe height for the read head and a target throat height for the write head.

2. The method of claim 1, further comprising
    monitoring the read head stripe height and the write head throat height during the lapping; and
    controlling the lapping wedge angle using the applied torque based on the monitored read head stripe height and the write head throat height.

3. The method of claim 2, wherein monitoring comprises receiving signals from an electric lapping guide reflecting a current stripe height and from an electric lapping guide reflecting a current throat height and adjusting the torque to change the lapping wedge angle.

4. The method of claim 1, wherein the recording head is a recording head within a row.

5. The method of claim 4, wherein at least one of the plurality of lapping forces is adjusted to achieve an average lapping rate of the row.

6. A method for controlling stripe height and throat height of a recording head, comprising:
    forming a slider including a recording head having a read head and a write head, the slider having a first length, the first length having a first side and a second side, the slider having a wedge height defined by the difference between the height of first side of the slider body and the second side of the slider body, wherein the magnetic read head and the write head are separated by a separation distance;
    measuring the difference between the height of first side of the slider body and the second side of the slider body;
    providing the measured difference between the height of first side of the slider body and the second side of the slider body to a lapping process; and
    lapping the read and write head while applying a torque force to achieve a target wedge angle for canceling the measured difference between the height of first side of the slider body and the second side of the slider body to provide a target stripe height for the read head and a target throat height for the write head.

* * * * *